US012786564B2

(12) United States Patent
Adamyan et al.

(10) Patent No.: US 12,786,564 B2
(45) Date of Patent: Nov. 3, 2026

(54) SYSTEM AND METHOD FOR INTEGRATED INSTRUMENT DETECTION AND AUTOFOCUS

(71) Applicant: SYNAPTIVE MEDICAL INC., Toronto (CA)

(72) Inventors: Hayk Adamyan, Burlington (CA); Gal Sela, Toronto (CA); Joshua Lee Richmond, Toronto (CA)

(73) Assignee: SYNAPTIVE MEDICAL INC., Mississauga (CA)

( * ) Notice: Subject to any disclaimer, the term of this patent is extended or adjusted under 35 U.S.C. 154(b) by 238 days.

(21) Appl. No.: 18/674,338

(22) Filed: May 24, 2024

(65) Prior Publication Data

US 2025/0365506 A1 Nov. 27, 2025

(51) Int. Cl.

| | |
|---|---|
| ***G06V 10/25*** | (2022.01) |
| ***G06V 10/26*** | (2022.01) |
| ***G06V 10/764*** | (2022.01) |
| ***G06V 10/82*** | (2022.01) |
| ***H04N 23/61*** | (2023.01) |
| ***H04N 23/67*** | (2023.01) |

(52) U.S. Cl.
CPC ........... *H04N 23/675* (2023.01); *G06V 10/25* (2022.01); *G06V 10/26* (2022.01); *G06V 10/764* (2022.01); *G06V 10/82* (2022.01); *H04N 23/61* (2023.01); *G06V 2201/034* (2022.01)

(58) Field of Classification Search
None
See application file for complete search history.

(56) References Cited

U.S. PATENT DOCUMENTS

| | | | | |
|---|---|---|---|---|
| 2017/0143429 | A1* | 5/2017 | Richmond ............. | A61B 34/37 |
| 2022/0120664 | A1* | 4/2022 | Rognin .............. | G01N 15/1434 |
| 2023/0377184 | A1* | 11/2023 | Liu ........................... | G06T 7/73 |
| 2024/0021103 | A1* | 1/2024 | Jørgensen ............ | G09B 23/285 |

* cited by examiner

*Primary Examiner* — Idowu O Osifade

(57) ABSTRACT

A method includes: capturing, via a camera, an image depicting an instrument; detecting a boundary of the instrument within the image; determining, based on the boundary, a region of interest within the image, the region of interest corresponding to a distal portion of the instrument; and controlling the camera to focus on the region of interest for capture of a further image.

10 Claims, 7 Drawing Sheets

SYSTEM AND METHOD FOR INTEGRATED INSTRUMENT DETECTION AND AUTOFOCUS

FIELD

The specification relates generally to surgical navigation systems, and specifically to a system and method for integrated instrument detection and autofocus system.

BACKGROUND

Certain surgical procedures (e.g., neurosurgery) may involve the use of an exoscope, configured to capture a video stream of patient tissue in an area of interest and display the video stream. The exoscope may provide a magnified view of the patient tissue, for example. An exoscope may have a relatively narrow field of view and/or a relatively small depth of field. In order to position the exoscope and focus the exoscope on the patient tissue, some navigational systems deployed with exoscopes include tracking cameras configured to detect fiducial markers on surgical instruments, in order to track the position of the instruments in three dimensions. Based on the detected instrument positions, the exoscope can be automatically positioned and focused.

Affixing fiducial markers to some instruments, however, may render those instruments cumbersome to use. Further, line of sight obstructions may prevent the tracking cameras from consistently tracking the position of some instruments.

SUMMARY

Examples disclosed herein are directed to a method including: capturing, via a camera, an image depicting an instrument; detecting a boundary of the instrument within the image; determining, based on the boundary, a region of interest within the image, the region of interest corresponding to a distal portion of the instrument; and controlling the camera to focus on the region of interest for capture of a further image.

Further examples disclosed herein are directed to a computing device, including: a processor configured to: capture, via a camera, an image depicting an instrument; detect a boundary of the instrument within the image; determine, based on the boundary, a region of interest within the image, the region of interest corresponding to a distal portion of the instrument; and control the camera to focus on the region of interest for capture of a further image.

BRIEF DESCRIPTIONS OF THE DRAWINGS

Embodiments are described with reference to the following figures.

DETAILED DESCRIPTION

Figure 1:
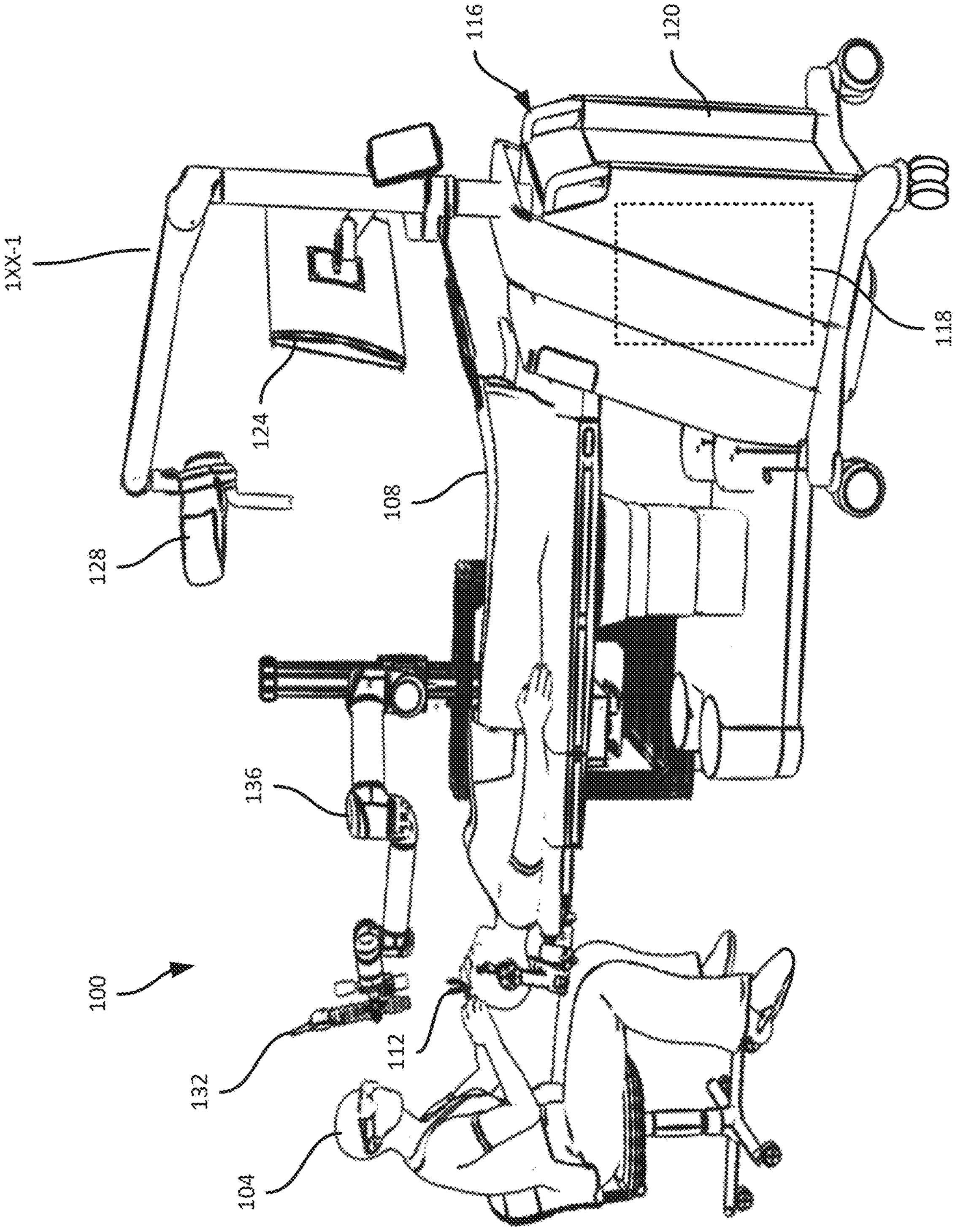
FIG. 1 is a diagram of a system for integrated instrument detection and autofocus.

FIG. 1 depicts a system 100, e.g., deployed in a surgical operating theatre in which a healthcare worker 104 (e.g., a surgeon or the like) operates on a patient 108. In this example, the worker 104 is shown conducting a minimally invasive surgical procedure on the brain of the patient 108. The procedure can involve, for example, the insertion and manipulation of instruments into the brain through an opening made in a skull of the patient 108 that is smaller than the portions of skull removed to expose the brain in traditional brain surgery techniques.

The opening through which the worker 104 inserts and manipulates instruments can be provided by an access port 112. The access port 112 can include a hollow cylindrical device with open ends, and can be inserted into an opening drilled in the skull of the patient 108. During insertion of access port 112 into the brain, an introducer (not shown) is generally inserted into access port 106. The introducer can include a cylindrical device that slidably engages the internal surface of the access port 112, and has an atraumatic tip, facilitating movement of the access port 112 into the sulcal folds of the brain while mitigating tissue damage during such movement. Following insertion of the access port 112, the introducer can be removed, and the access port 112 can then enable insertion and manipulation of surgical tools into the brain. Examples of such tools include suctioning devices, scissors, scalpels, cutting devices, imaging devices (e.g., ultrasound sensors) and the like.

FIG. 1 also illustrates an equipment cart 116 that can support a computing device 118 such as a desktop computer, e.g., within a base 120 of the cart 116. The cart 116 can support a display 124 connected to the computing device 118, e.g., for displaying images stored and/or generated at the computing device 118. The computing device 118, display 124, or both, can be supported by other structures than the cart 116, in other implementations. In some examples, the computing device 118 can be located outside of operating theatre.

The cart 116 can also support a tracking system 128, e.g., including a stereo camera, a time-of-flight (ToF) camera, or the like. The tracking system 128 can be configured to track the positions of fiducial markers (not shown) mounted on various other components of the system 100, such as the access port 112 and/or the instruments mentioned above (e.g., suctioning devices, etc.). Fiducial markers can also be mounted on the patient 108, for example at various points on the head of the patient 108.

The tracking system 128, either via an integrated computing device or via the computing device 118, can capture a sequence of images (e.g., a video stream) and process the images to locate fiducial markers therein. The tracking system 128 and/or the computing device 118 can determine the spatial positions of the detected markers, e.g., according to a coordinate system previously established within the operating theatre. The spatial positions of the detected markers can be compared to stored instrument definitions, for example, to identify instruments within the field of view of the tracking system 128 and determine the position and orientation of those instruments according to the above coordinate system. The positions and orientations of instruments can then be presented, e.g., on the display 124, along with medical images, also aligned with the coordinate system.

Certain instruments, however, may be challenging to track accurately and/or consistently via the tracking system 128. For example, an instrument may be partially or fully obscured from view by line-of-sight obstructions between the tracking system's camera and the instrument, e.g., the worker 104 or other staff, other instruments, and the like. Further, some functions implemented in the system 100 may involve determining the position of an instrument to a greater degree of precision than the tracking system 128 can achieve. Those functions can include an autofocus function of a exoscope 132, e.g., mounted on a support such as a robotic arm 136.

The exoscope 132 has a field of view that can be positioned over the access port 112, e.g., via control of the robotic arm 136. The exoscope can capture images of patient tissue through the access port 112, e.g., for presentation on the display 124 to provide visual guidance to the worker 104. The exoscope may have a small depth of field (e.g., less than 5 cm in some examples, and less than 1 cm in some examples). The movement of tissue and/or instruments within the access port 112 can necessitate frequent re-focusing of the exoscope 132, and such movements may be sufficiently small as to be poorly detected by the tracking system 128. The relatively constrained working space for instruments extended into the access port 112 can render the use of fiducial markers inconvenient. Further, the breadth of instruments that may be used in surgical procedures is such that providing implementations of each instrument equipped with fiducial markers can be costly.

As discussed below, the computing device 118 can be configured to process the images captured by the exoscope 132 to detect the position of a distal end (e.g., a tip) of one or more instruments within the access port 112, and to automatically adjust the focus of the exoscope 132 based on such detected positions. In some examples, the distal end is the actual tip of an instrument, while in other examples, the distal end is the most distal visible portion of the instrument, as the tip may be obscured by tissue. The computing device 118 implements instrument detection and autofocus without relying on fiducial marker detection, and can therefore operate on instruments lacking fiducial markers, and is not vulnerable to line-of-sight obstructions to such markers.

Figure 2:
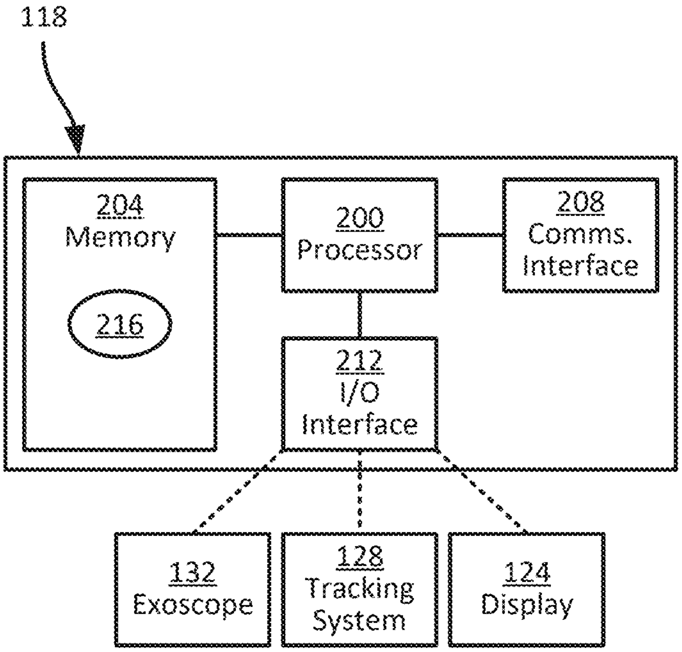
FIG. 2 is a diagram of certain internal components of a computing device in the system of FIG. 1.

Turning to FIG. 2, certain internal components of the device 118 are also shown in FIG. 1. the device 118 includes a processor 200 (e.g., a central processing unit (CPU), graphics processing unit (GPU), and/or other suitable control circuitry, microcontroller, or the like) interconnected with a non-transitory computer readable storage medium, such as a memory 204. The memory 204 includes a combination of volatile memory (e.g. Random Access Memory or RAM) and non-volatile memory (e.g. read only memory or ROM, Electrically Erasable Programmable Read Only Memory or EEPROM, flash memory). The memory 204 can store computer-readable instructions, execution of which by the processor 200 configures the processor 200 to perform various functions in conjunction with certain other components of the device 118. The device 118 can also include a communications interface 208 enabling the device 118 to exchange data with other computing devices, e.g., via suitable networks, short-range communications links, and the like.

The device 118 can also include an input/output interface 212 configured to interconnect the processor 200 with one or more peripheral devices. Such peripheral devices can be supported within the same enclosure as the processor 200 and memory 204 in some examples, or in separate, external enclosures in other examples (e.g., in the case of the display 124). The interface 212 can include a plurality of distinct hardware interfaces and associated circuitry storing and executing firmware or the like. For example, the interface 212 can implement any suitable combination of Universal Serial Bus (USB) controllers, serial interfaces, Peripheral Component Interconnect (PCI) interfaces, or the like. The devices connected to the processor 200 via the interface 212 can include the display 124, the tracking system 128, and the exoscope. Inputs such as a keyboard, mouse, touch screen, keypad, or the like, can also be connected with the processor 200 via the interface 212.

As noted above, the memory 204 can store instructions executable by the processor 200, e.g., in the form of an autofocus application 216. Via execution of the application 216, the processor 200 is configured to process images captured using the exoscope, segment certain instruments within those images, and generate focus control data for the exoscope based on the segmentation.

Figure 3:
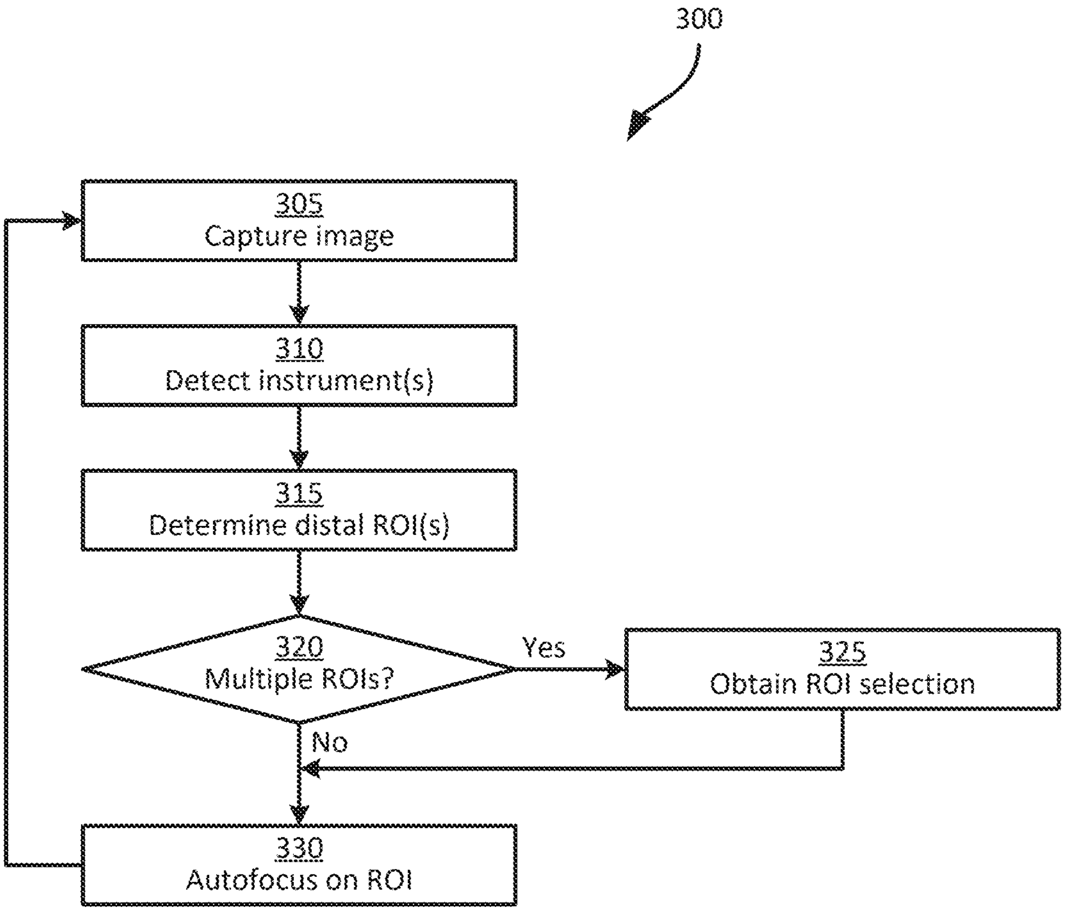
FIG. 3 is a flowchart of a method for integrated instrument detection and autofocus.

Turning to FIG. 3, a method 300 of integrated instrument detection and autofocus is illustrated. The method 300 is described below in conjunction with its example performance in the system 100, and in particular by the computing device 118 in cooperation with the exoscope 132.

At block 305, the device 118 is configured to capture an image via a camera such as the exoscope 132. For example, the exoscope 132 can be configured to capture, and transmit to the computing device 118, a sequence of images such as a video stream at any suitable frame rate. The computing device 118 can therefore be configured to perform the method 300 on each frame in the sequence, or on a subset of the frames at a frequency selected according to the computational resources of the computing device 118 and/or the performance requirements of the autofocus function at the exoscope 132.

At block 310, the device 118 is configured to detect one or more instruments in the image captured at block 305. Detecting a given instrument in the image includes detecting a boundary of the instrument. In other words, the device 118 is configured to determine a particular region of the image that contains the instrument, thus segmenting the instrument from a remainder of the image. The device 118 can implement the above-mentioned segmentation process by executing a suitable classifier, e.g., trained to detect and segment one or more types of instruments within the image.

Figure 4:
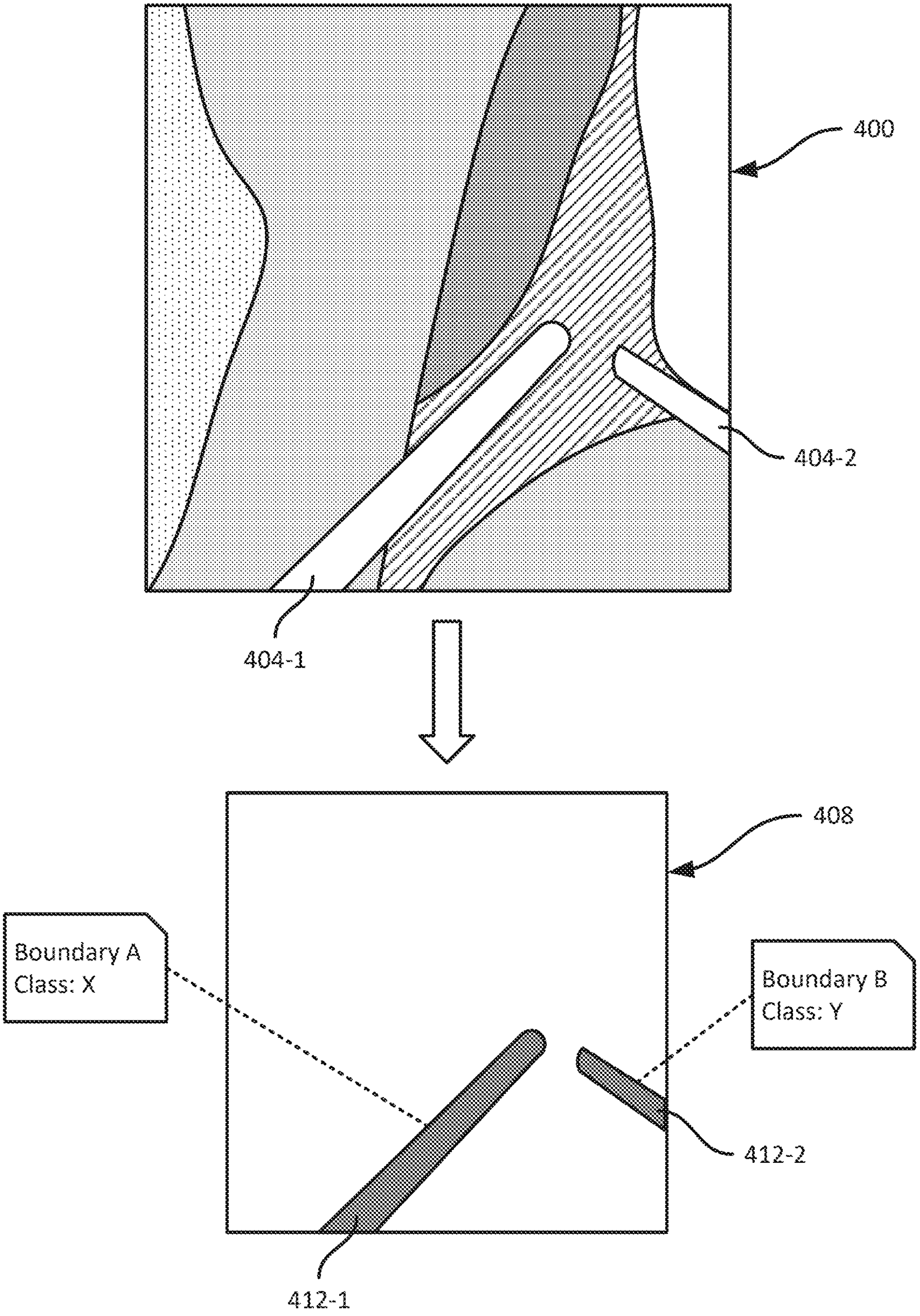
FIG. 4 is a diagram illustrating an example performance of blocks 305 and 310 of the method of FIG. 3.

Turning to FIG. 4, an example image 400 is illustrated, e.g., as received at the processor 200 from the exoscope 132. The image 400 encompasses a field of view aimed through the access port 112, and thus depicts various patient tissues shown with different shading or hatching in FIG. 4. The image 400 also depicts portions of a first instrument 404-1, and a second instrument 404-2. The instruments 404 may be manipulated by the worker 104, and may therefore extend into the access port 112 from outside the field of view of the exoscope 132.

Via the performance of block 310, the device 118 is configured to segment the instruments 404 from a remainder of the image 400, e.g., generating a mask 408 that indicates boundaries of the portions of the instruments 404 visible in the image 400. The device 118 can, for example, implement a segmentation algorithm or set of segmentation algorithms to assign a class to each pixel in the image 400. The classes can be selected from one or more instrument classes the device 118 has been trained to recognize, and a non-instrument class. The device 118 can generate the mask 408 by retaining any pixels with instrument classes, and detecting contiguous regions of instrument-classified pixels. Each such region can be identified (e.g., boundary identifiers "A"

and "B" are shown in FIG. 4, although a wide variety of other identifiers can also be used). The class of the pixels in each boundary can also be stored in association with the boundary identifier. In some examples, a single instrument class can be implemented for multiple instrument types, such that the segmentation algorithm(s) assign that instrument class to any pixel containing an instrument, regardless of which type of instrument.

The device 118 can implement any of a variety of segmentation processes to detect the instrument(s) 404 in the image 400. In some examples, turning to FIG. 5A, the application 216 can implement a classifier according to a neural network based on the U-NET architecture, e.g., including an encoding cascade 500 composed of successive convolutional layers connected by pooling operations 502, reducing the resolution and increasing channel depth at each layer. The architecture also includes a decoding cascade 504, including successive convolutional layers connected by up sampling operations 506. The layers of the decoding cascade 504 can also employ input data from the corresponding layers of the encoding cascade 500, via "skip" connections.

Figure 5A:
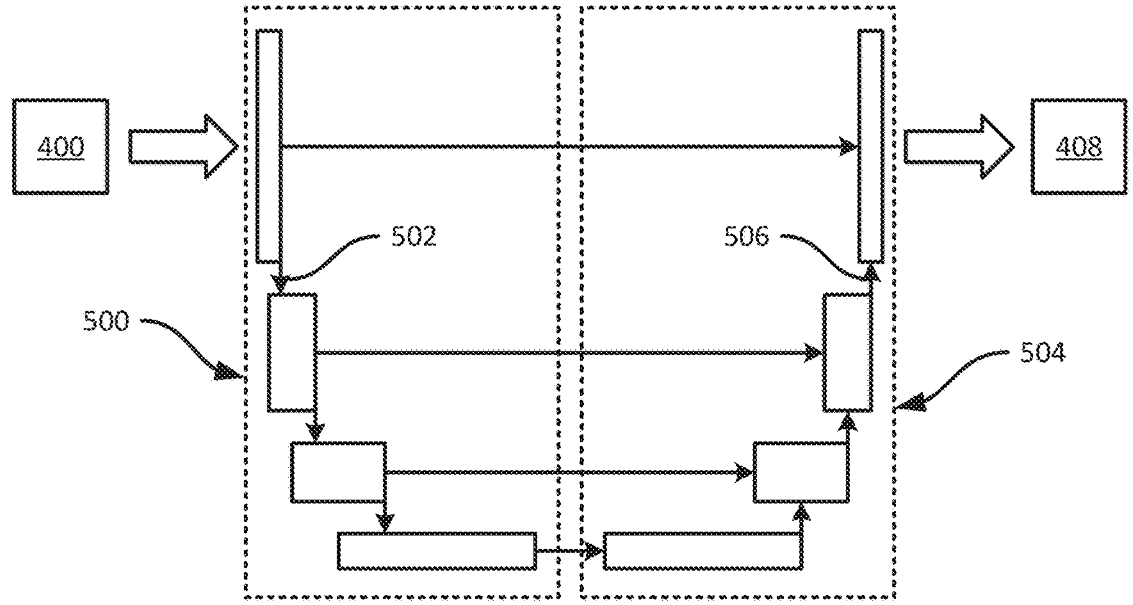
FIG. 5A is a diagram illustrating an example classifier used to perform block 310 of the method of FIG. 3.

Training a classifier based on the U-NET architecture shown in FIG. 5A can include providing a set of labelled training images (e.g., with the boundaries 412 manually labelled) and iteratively adjusting model weights to minimize an error metric between the label data and boundaries generated via the classifier. Training such a classifier may, however, be a time-consuming process, e.g., involving a large set of labelled images (e.g., thousands of images). Further, the training process may be prone to overfitting, e.g., producing suboptimal results on new images from different video streams.

Figure 5B:
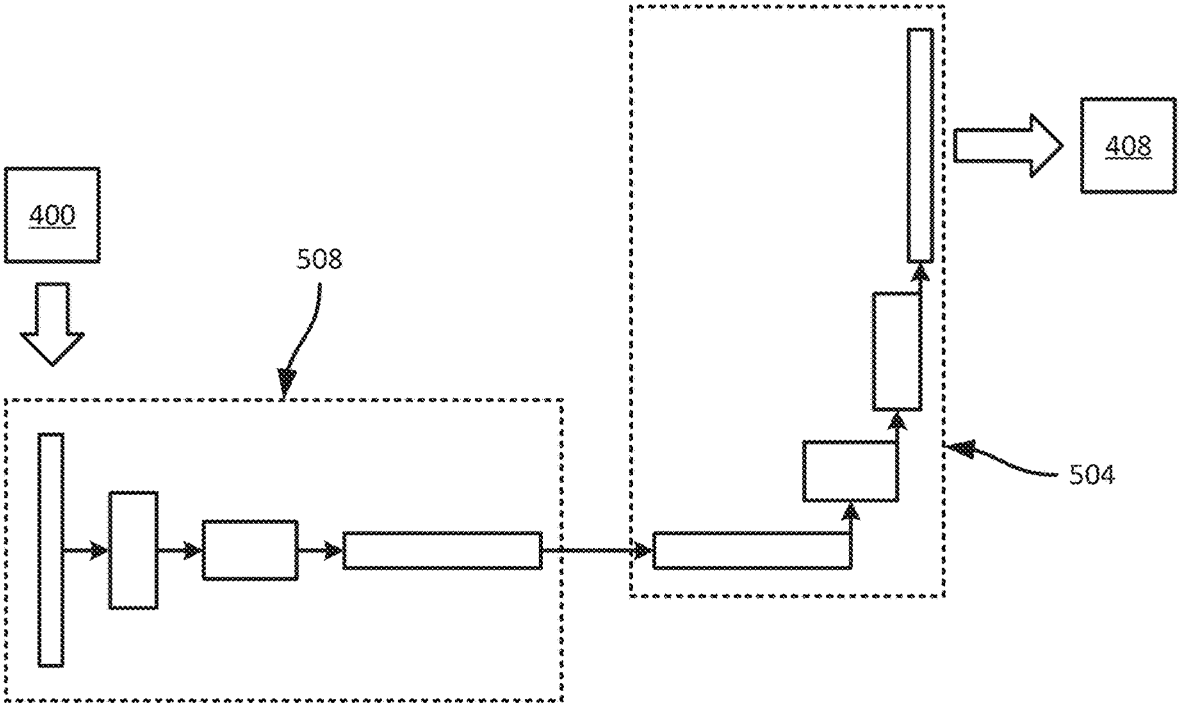
FIG. 5B is a diagram illustrating another example classifier used to perform block 310 of the method of FIG. 3.

In some examples, the classifier can be based on the decoder 504, in combination with an autoencoder 508. The autoencoder 508, as will be apparent to those skilled in the art, includes only the encoding portion of an autoencoder trained on a set of input images, omitting the decoder portion. That is, the code or bottleneck of the autoencoder can be used as input to the lowest layer of the U-NET decoder 504. The input images need not be labelled for training the autoencoder 508, and the autoencoder 508 may also be more amenable to training based on synthetic images that can readily be generated in bulk. To train a classifier as shown in FIG. 5B, for example, the autoencoder can first be trained in an unsupervised manner on unlabeled data. A set of labelled training images can then be prepared, and provided to the autoencoder as input, with the resulting coded versions of such images being provided to the U-NET decoder cascade 504 for training. Because only one half of the U-NET architecture requires training, the volume of labelled training data may be reduced. It has been observed that the combination of autoencoder and U-NET decoder shown in FIG. 5B is less time-consuming to train and more resistant to overfitting when presented with new input images.

Returning to FIG. 3, at block 315 the device 118 is configured to determine, for each boundary detected in the image 400, a region of interest (ROI) corresponding to a distal portion (e.g., a tip) of the instrument. The distal portion of the instrument is the furthest extent of the instrument into the access port 112 and/or patient tissues. The instruments 404 can be used to manipulate patient tissues, e.g., with visual aid from the images captured by the exoscope 132 and presented on the display 124. The manipulation of patient tissue may be facilitated by focusing the field of view of the exoscope 132 on or near the tips of the instruments 404. Detection of the tip of an instrument within the field of view of the exoscope 132 can therefore enable the device 118 to focus the exoscope 132 on the portion of the field of view containing the tip.

Figure 6:
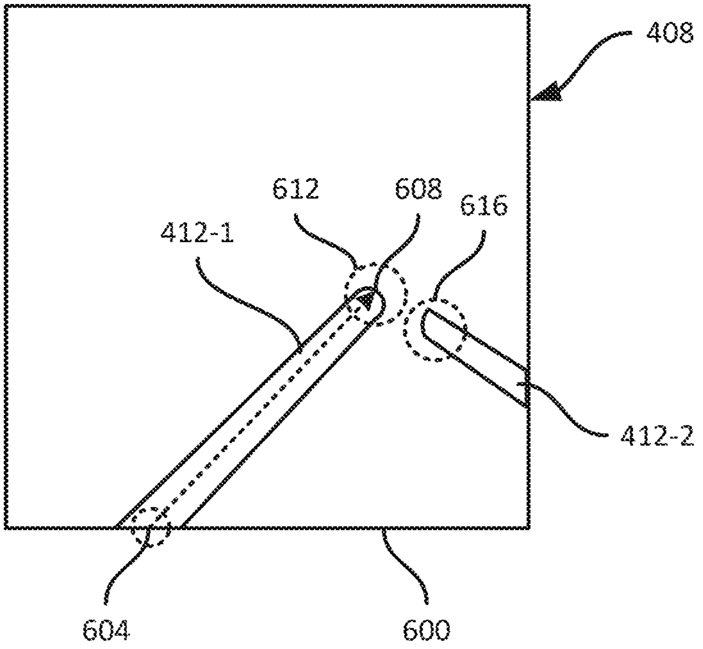
FIG. 6 is a diagram illustrating an example performance of block 315 of the method of FIG. 3.

Identifying an ROI corresponding to an instrument tip can be performed, as illustrated in FIG. 6, by locating a reference pixel. The reference pixel is adjacent to an edge of the image. For example, the device 118 can select, as the reference pixel for a given boundary 412, the pixel within the boundary 412 that is closest to any edge of the image 400 (the edges of the image 400 and of the mask 408 may be equivalent). When, as in the example shown in FIG. 6, there are more than one pixel within the boundary 412-1 at equal distances to an edge 600 of the mask 408 (that is, several pixels may lie on the edge 600), the device 118 can be configured to select the middle of those pixels as a reference pixel 604. In other examples, the device 118 can select the pixel closest to a corner of the mask 408 as the reference pixel 604.

Having identified the reference pixel 604, the device 118 is configured to identify a distal pixel 608 within the boundary 412-1 that is furthest (e.g., at the greatest Euclidean distance) from the reference pixel 604. More generally, the distal pixel 608 is further from the reference pixel 604 than at least a threshold portion of the pixels in the boundary 412-1 (e.g., 90 percent of the boundary 412-1). The device 118 can then be configured to generate an ROI 612 with the pixel 608 at the center thereof. For example, the ROI 612 can have a predetermined radius or other suitable dimension (s) (e.g., the ROI need not be circular, but can be rectangular instead). The same process can be repeated for the boundary 412-2, e.g., to identify an ROI 616 corresponding to a distal portion of the boundary 412-2.

Figure 7:
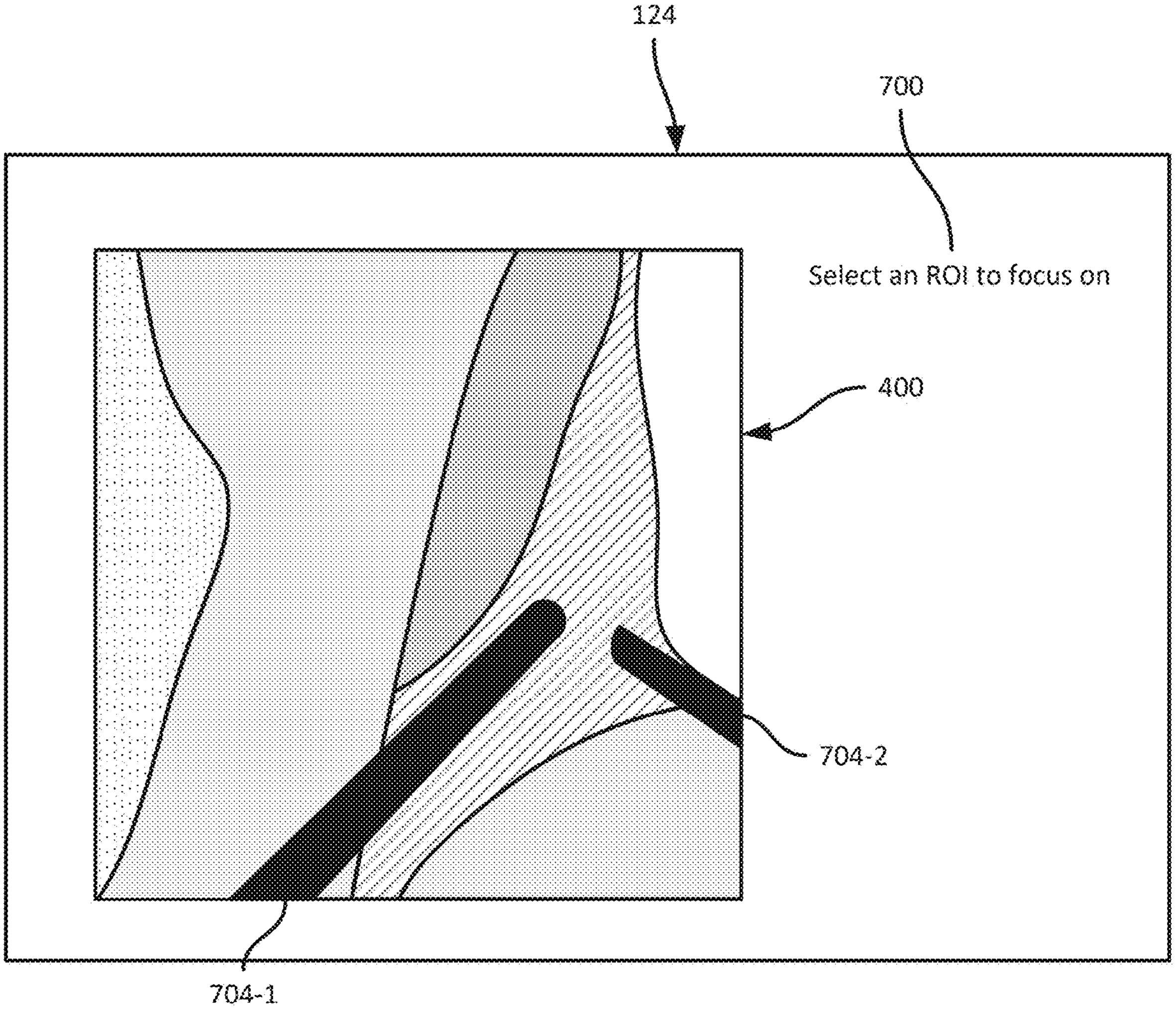
FIG. 7 is a diagram illustrating an example performance of block 320 of the method of FIG. 3.

Referring again to FIG. 3, at block 320 the device 118 can be configured to determine whether more than one ROI was identified at block 315. When the determination is affirmative at block 320, as in the example of FIG. 6, the device 118 proceeds to block 325. At block 325, the device 118 is configured to obtain an ROI selection. The selection can be obtained by presenting a prompt, e.g., on the display 124, to request a selection from the worker 104 or another operator. An example prompt 700 is shown in FIG. 7, presented alongside the image 400. The image 400 can be presented with selectable masks 704-1 and 704-2 corresponding to the boundaries 412 overlaid on the corresponding portions of the image.

In other examples, the selection at block 320 can be made automatically, e.g., by determining whether any of the detected boundaries satisfy a predetermined criterion. The criterion can include a particular instrument class configured for autofocus priority, and/or a visual attribute such as a particular color of a certain instrument or type of instrument.

When an ROI selection has been obtained, or when only one ROI is detected, the device 118 proceeds to block 330, and controls the exoscope 132 to focus on a region of the field of view corresponding to the selected ROI. For example, the processor 200 can transmit an autofocus command to the exoscope including coordinates of the distal pixel 608, the ROI 612, or the like. The exoscope 132 can, in turn, focus on the identified portion of the field of view, and capture a subsequent image. In some examples, rather than automatically send a focus command to the exoscope 132, the device 118 can await an instruction, e.g., from an operator such as the worker 104, to update a focus of the exoscope 132.

The scope of the claims should not be limited by the embodiments set forth in the above examples, but should be given the broadest interpretation consistent with the description as a whole.

The invention claimed is:

1. A method, comprising:

capturing, via a camera, an image depicting an instrument;

detecting a boundary of the instrument within the image, wherein detecting the boundary comprises executing a classifier to segment the boundary from a remainder of the image, the classifier including an autoencoder and a U-NET decoder;

determining, based on the boundary, a region of interest within the image, the region of interest corresponding to a distal portion of the instrument, wherein determining the region of interest includes: identifying a reference pixel of the boundary, the reference pixel being adjacent to an edge of the image; selecting a distal pixel of the boundary, the distal pixel being at a greater distance from the reference pixel than at least a predefined portion of the pixels within the boundary; and generating the region of interest based on the distal pixel; and controlling the camera to focus on the region of interest for capture of a further image.

2. The method of claim 1, wherein the reference pixel is a pixel within the boundary that is closest to any edge of the image, and wherein when more than one pixel within the boundary is at equal distances to the edge of the image, a middle pixel of the more than one pixel is selected as the reference pixel.

3. The method of claim 1, further comprising:

prior to controlling the camera to focus on the region of interest, obtaining a selection of the region of interest.

4. The method of claim 3, wherein obtaining the selection includes determining that the boundary satisfies a predetermined criterion, and in response automatically selecting the boundary.

5. The method of claim 3, further comprising:

detecting a second boundary in the image;

determining a second region of interest based on the second boundary; and presenting a prompt for a selection of the region of interest or the second region of interest.

6. A computing device, comprising:

a processor configured to:

capture, via a camera, an image depicting an instrument;

detect a boundary of the instrument within the image, wherein detecting the boundary comprises executing a classifier to segment the boundary from a remainder of the image, the classifier including an autoencoder and a U-NET decoder;

determine, based on the boundary, a region of interest within the image, the region of interest corresponding to a distal portion of the instrument, wherein determining the region of interest includes: identifying a reference pixel of the boundary, the reference pixel being adjacent to an edge of the image; selecting a distal pixel of the boundary, the distal pixel being at a greater distance from the reference pixel than at least a predefined portion of the pixels within the boundary; and generating the region of interest based on the distal pixel; and control the camera to focus on the region of interest for capture of a further image.

7. The computing device of claim 6, wherein the reference pixel is a pixel within the boundary that is closest to any edge of the image, and wherein when more than one pixel within the boundary is at equal distances to the edge of the image, a middle pixel of the more than one pixel is selected as the reference pixel.

8. The computing device of claim 6, wherein the processor is configured to:

prior to controlling the camera to focus on the region of interest, obtain a selection of the region of interest.

9. The computing device of claim 8, wherein the processor is configured to obtain the selection by determining that the boundary satisfies a predetermined criterion, and in response automatically selecting the boundary.

10. The computing device of claim 8, wherein the processor is configured to:

detect a second boundary in the image;

determine a second region of interest based on the second boundary; and present a prompt for a selection of the region of interest or the second region of interest.

* * * * *